United States Patent
Jacob et al.

(10) Patent No.: US 10,781,295 B2
(45) Date of Patent: *Sep. 22, 2020

(54) MOONEY VISCOSITY STABLE BROMINATED ELASTOMERS

(71) Applicant: ExxonMobil Chemical Patents Inc., Baytown, TX (US)

(72) Inventors: Sunny Jacob, Seabrook, TX (US); Michael F. McDonald, Jr., Kingwood, TX (US); Adam H. Scott, Singapore (SG); Joel E. Schmieg, Humble, TX (US); Timothy D. Shaffer, Jr., Hackettstown, NJ (US); John A. Clark, Seabrook, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/113,372

(22) PCT Filed: Dec. 15, 2014

(86) PCT No.: PCT/US2014/070301
§ 371 (c)(1),
(2) Date: Jul. 21, 2016

(87) PCT Pub. No.: WO2015/130391
PCT Pub. Date: Sep. 3, 2015

(65) Prior Publication Data
US 2017/0009058 A1    Jan. 12, 2017

Related U.S. Application Data

(60) Provisional application No. 61/946,018, filed on Feb. 28, 2014.

(51) Int. Cl.
*C08K 5/3435* (2006.01)
*C08K 5/3492* (2006.01)
*C08K 3/014* (2018.01)
*C08K 5/00* (2006.01)

(52) U.S. Cl.
CPC ............ *C08K 5/3435* (2013.01); *C08K 3/014* (2018.01); *C08K 5/005* (2013.01); *C08K 5/34926* (2013.01)

(58) Field of Classification Search
CPC ........ C08L 15/02; C08L 23/28; C08L 23/283; C08F 8/20; C08F 8/22; C08K 5/32; C08K 5/3435; C08K 5/3415
See application file for complete search history.

(56) References Cited

U.S. PATENT DOCUMENTS

| | | | |
|---|---|---|---|
| 2,356,128 A | 8/1944 | Thomas et al. | |
| 3,334,103 A * | 8/1967 | Feldman | C07D 207/46 252/401 |
| 3,534,123 A * | 10/1970 | Manuel | C08K 5/39 524/202 |
| 4,068,051 A | 1/1978 | Baldwin et al. | |
| 4,474,924 A | 10/1984 | Powers et al. | |
| 4,602,063 A * | 7/1986 | Yamamoto | C08G 81/028 525/127 |
| 4,754,793 A * | 7/1988 | Mohammed | C08K 3/04 152/510 |
| 4,920,165 A | 4/1990 | Warrach et al. | |
| 5,116,894 A * | 5/1992 | Knobloch | C08K 5/375 524/100 |
| 5,506,316 A | 4/1996 | Shaffer | |
| 5,670,582 A | 9/1997 | Chung et al. | |
| 5,681,901 A * | 10/1997 | Newman | C08F 8/22 525/333.4 |
| 5,710,200 A * | 1/1998 | Toratani | C08K 5/25 524/191 |
| 5,919,871 A * | 7/1999 | Nicol | C08F 4/00 525/333.8 |
| 6,194,509 B1 * | 2/2001 | Lin | B60C 1/0016 524/493 |
| 6,372,855 B1 | 4/2002 | Chino et al. | |
| 7,232,872 B2 | 6/2007 | Shaffer et al. | |
| 7,414,101 B2 | 8/2008 | Shaffer et al. | |
| 7,858,735 B2 | 12/2010 | Yeh et al. | |
| 8,524,859 B2 | 9/2013 | Wang et al. | |
| 2006/0073351 A1 * | 4/2006 | Natsuyama | B32B 25/08 428/521 |
| 2007/0142565 A1 * | 6/2007 | Chaudhary | C08F 8/50 525/330.3 |

FOREIGN PATENT DOCUMENTS

| | | |
|---|---|---|
| CN | 103467636 A | 12/2013 |
| EP | 1 591 480 | 11/2005 |
| EP | 2 045 289 | 4/2009 |
| RU | 2243216 C | 12/2004 |
| WO | 2005/063896 | 7/2005 |
| WO | 2008/003605 | 1/2008 |
| WO | 2008/113702 A | 9/2008 |
| WO | 2013/011017 A | 1/2013 |

OTHER PUBLICATIONS

Rogers (Chapter 4: Butyl Rubbers, Rubber Compounding Chemistry and Applications, 2004, pp. 133-162).*
Nocil (Antioxidants & Antidegradants. http://www.nocil.com/Downloadfile/ETechnicalNote-Antioxidants-Dec2010.pdf, 44 pages).*
Rodgers, B., Rubber Compounding Chemistry and Applications, Marcel Dekker, Inc., pp. 134-135 (2004).

* cited by examiner

*Primary Examiner* — Brieann R Johnston

(57) ABSTRACT

This invention relates to a brominated elastomer composition comprising a free radical scavenger. The scavenger is present in the amount of at least about 0.05 wt % of the composition. The scavenger is added to the composition so that the Mooney viscosity of the composition does not increase by more than about 15% to about 40%, for up to about 15 days at 80° C. The scavenger can be a sterically hindered nitroxyl ether, a nitroxyl radical, or both.

4 Claims, 2 Drawing Sheets

MOONEY VISCOSITY STABLE BROMINATED ELASTOMERS

PRIORITY CLAIM TO RELATED APPLICATIONS

This application is a National Stage Application of International Application No. PCT/US2014/070301, filed Dec. 15, 2014, and claims priority to and the benefit of U.S. Ser. No. 61/946,018, filed Feb. 28, 2014, the disclosures of which are fully incorporated herein by reference in their entireties.

FIELD OF THE INVENTION

This invention relates to a brominated elastomer/polymer with improved Mooney viscosity stability over time.

BACKGROUND OF THE INVENTION

The present invention is related to brominated isomonoolefin derived elastomeric compositions particularly useful for tire and other industrial rubber applications that require Mooney viscosity stability over time.

Elastomers present in innerliner compounds are generally prepared by the direct bromination of isobutylene derived rubbers using $Br_2$. Alternatively, isobutylene derived elastomers are prepared with an oxidant. The former method is known as conventional bromination, the latter is known as bromine regeneration. U.S. Pat. No. 5,681,901 discloses bromine regeneration. Bromine regeneration is a more efficient method of bromination because regeneration yields a greater maximum theoretical bromine utilization compared to conventional bromination.

Brominated isobutylene derived elastomers, also referred to as bromobutyl elastomers, prepared by either conventional bromination or bromine regeneration, are naturally susceptible to Mooney growth due to the chemistry employed in the preparation of the bromobutyl elastomers. "Mooney growth" is a term commonly used in the art to refer to increasing Mooney viscosity over time. Mooney growth of the elastomeric polymer can lead to unsatisfactory processability of innerliner compounds. Unlike bromobutyl elastomers, other halobutyl elastomers, such as chlorobutyl elastomers, generally do not experience the same degree of increasing Mooney viscosity as bromobutyl elastomers due to the greater bonding strength of chlorine, as compared to bromine, to the polymer structure.

It is generally known to use additives including antioxidants to stabilize elastomers from Mooney growth. Antioxidants include Irganox™ 1010 and butylated hydroxytoluene (BHT).

However, the degree of Mooney growth stabilization of bromobutyl polymers which can be achieved by using antioxidants is relatively short term. The presence of acidic species in the bromobutyl elastomers adds further complexity to addressing the Mooney growth problem because acidic species affect hydrolytic stability of antioxidants and can ultimately result in a decrease of potency of antioxidants. Thus, there is a need to further improve the stability of elastomers from Mooney growth in an economic manner by using other stabilizers, either alone or in combination with antioxidants.

SUMMARY OF THE INVENTION

The foregoing and/or other challenges are addressed by the products and methods disclosed herein.

In one aspect, the present invention is directed to a bromobutyl elastomer comprising a free radical scavenger in the amount of at least about 0.05 wt % of the composition, wherein the Mooney viscosity of the elastomer does not increase by more than about 15% to about 40%, for up to about 15 days at 80° C.

In one aspect, the present invention is directed to a method of adding a free radical scavenger to a bromobutyl elastomer composition in the amount of at least about 0.05 wt % of the composition, wherein the Mooney viscosity of the composition does not increase by more than about 40%, for up to about 15 days at 80° C.

DETAILED DESCRIPTION

Figure 1:
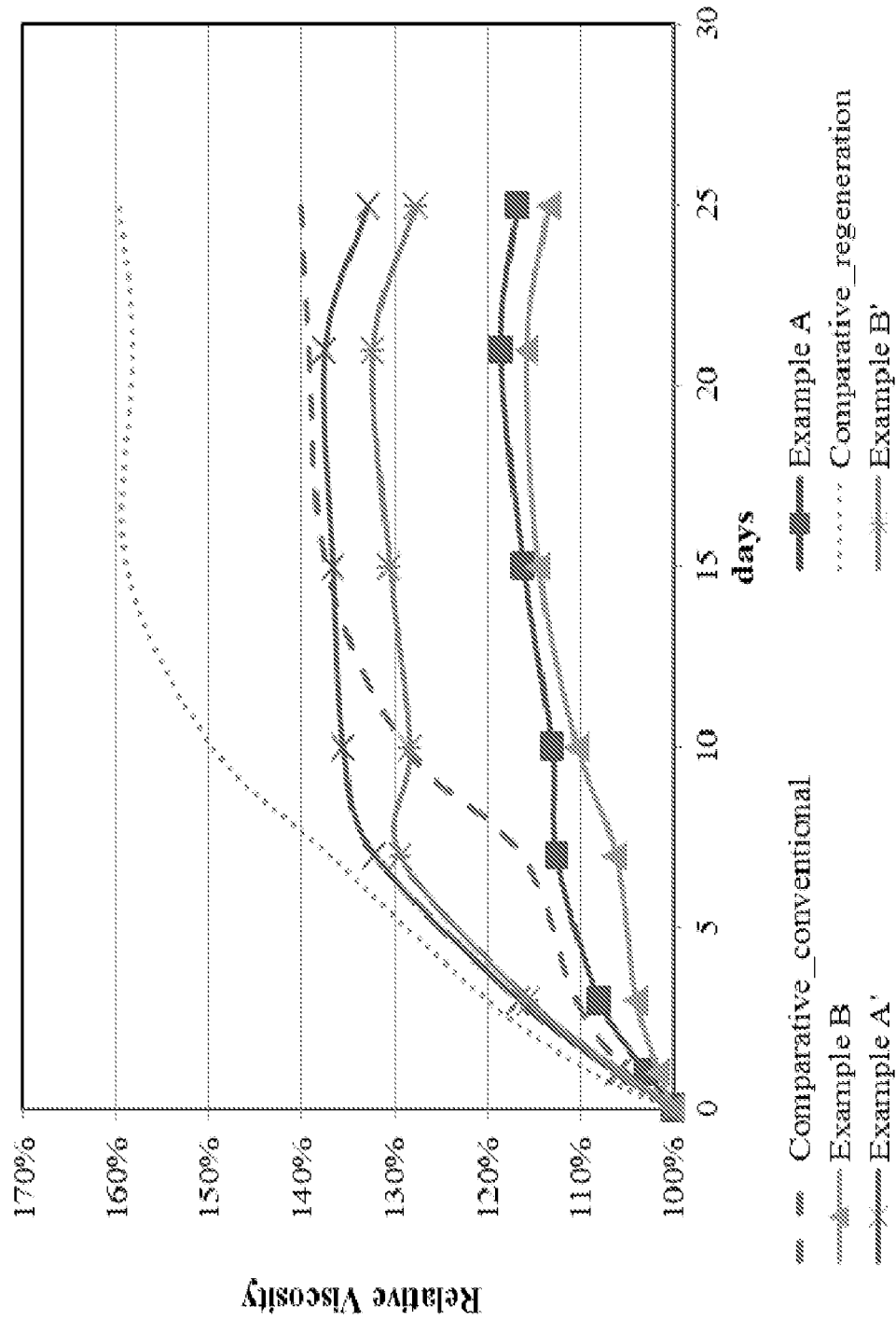
FIG. 1 depicts viscosity stability of bromobutyl elastomers having TEMPO.

Various specific embodiments of the invention will now be described, including preferred embodiments and definitions that are adopted herein for purposes of understanding the claimed invention. While the illustrative embodiments have been described with particularity, it will be understood that various other modifications will be apparent to and can be readily made by those skilled in the art without departing from the spirit and scope of the invention. For determining infringement, the scope of the "invention" will refer to any one or more of the appended claims, including their equivalents and elements or limitations that are equivalent to those that are recited.

The inventors have discovered that some classes of stabilizers, known as free radical scavengers, can assist in suppressing the increase in molecular weight of isomonoolefin derived elastomeric polymers, thereby reducing the amount of Mooney viscosity growth of the polymer. Suitable free radical scavengers include sterically hindered nitroxyl ethers and sterically hindered nitroxyl radicals. WO 2008/003605A1 discloses the structure and method of preparing sterically hindered nitroxyl ethers from nitroxyl radicals. Sterically hindered nitroxyl ethers and nitroxyl radicals are generally used in polyethylene film applications. Thus, the use of sterically hindered nitroxyl ethers and nitroxyl radicals to reduced Mooney growth in elastomers has not, until now, been discovered or appreciated.

This invention relates to a brominated elastomer composition comprising a free radical scavenger in the amount of at least about 0.05 wt % of the composition, wherein the Mooney viscosity of the composition does not increase by more than about 15% to about 40%, for up to about 15 days at 80° C. In another embodiment, this invention relates to a method of adding a free radical scavenger to a brominated elastomer composition in the amount of at least about 0.05 wt % of the composition, wherein the Mooney viscosity of the composition does not increase by more than about 40%, for up to about 15 days at 80° C.

Definitions

Definitions applicable to the presently described invention are as described below.

For the purpose of this specific application, the term 'composition' means the brominated elastomeric polymer to which the free radical scavenger has been added. The brominated polymer itself may already be modified by the inclusion of other antioxidants, as discussed both above and further below in the examples. The user of the inventive composition will create what is considered conventionally as 'compositions' in that the user will add fillers, curatives, and other ingredients to create a fully formulated composition useful as a finished article such as a curing bladder or for use in a finished article such as a tire innerliner, air diaphragm, or hose.

"Diluent" means a diluting or dissolving agent. Diluent is specifically defined to include chemicals that can act as dissolving agents, i.e., solvents, for the Lewis Acid, other metal complexes, initiators, monomers, or other additives, but which preferably do not act as dissolving agents for the elastomer obtained through polymerization of the dissolved monomers. In the practice of the invention, the diluent does not alter the general nature of the components of the polymerization medium, i.e., the components of the catalyst system, monomers, etc. However, it is recognized that interactions between the diluent and reactants may occur. In preferred embodiments, the diluent does not react with the catalyst system components, monomers, etc., to any appreciable extent. Additionally, the term diluent includes mixtures of at least two or more diluents. Diluents, in the practice of the invention, are generally hydrocarbon liquids, which may be halogenated with chlorine or fluorine as disclosed in U.S. Pat. No. 7,232,872.

"Solvent" means a hydrocarbon liquid that is capable of acting as a dissolving agent for an elastomeric polymer. Solvents, in the practice of the invention, are generally hydrocarbon liquids having the formula $C_xH_y$, wherein x is 5 to 20, and y is 12 to 22, such as hexane, isohexane, pentane, iso-pentane, and cyclohexane.

"Polymer(s)" means any homopolymer, copolymer, interpolymer, terpolymer, etc. Likewise, "copolymer(s)" means any polymer comprising at least two monomers, optionally with other monomers. When a polymer is referred to as comprising a monomer, the monomer is present in the polymer in the polymerized form of the monomer or in the polymerized form of a derivative from the monomer (i.e., a monomeric unit). However, for ease of reference the phrase comprising the (respective) monomer or the like is used as shorthand. Likewise, when catalyst components are described as comprising neutral stable forms of the components, it is well understood by one skilled in the art, that the ionic form of the component is the form that reacts with the monomers to produce polymers.

"Elastomer(s)" means any polymer or composition of polymers consistent with the ASTM D1566 definition of "a material that is capable of recovering from large deformations, and can be, or already is, modified to a state in which it is essentially insoluble, if vulcanized, (but can swell) in a solvent." Elastomers are often also referred to as rubbers. The term elastomer may be used herein interchangeably with the term rubber. Preferred elastomers have a melting point that cannot be measured by DSC or if it can be measured by DSC is less than 40° C., or preferably less than 20° C., or less than 0° C. Preferred elastomers have a Tg of −50° C. or less as measured by DSC.

"Mooney viscosity" or "viscosity" means the viscosity measure of rubbers. It is defined as the shearing torque resisting rotation of a cylindrical metal disk (or rotor) embedded in rubber within a cylindrical cavity. The dimensions of the shearing disk viscometer, test temperatures, and procedures for determining Mooney viscosity are defined in ASTM D1646. Mooney viscosity is measured in Mooney units.

Elastomers

Elastomers useful in the practice of this invention include a) polymers derived from at least one $C_4$ to $C_7$ isoolefin monomer and at least one multiolefin monomer and b) homopolymers of $C_4$ to $C_7$ isoolefin monomers. Copolymers comprising $C_4$-derived units are sometimes conventionally referred to as "butyl rubbers." For the copolymers, the isoolefin derived content in the copolymer is in a range from 70 to 99.5 wt % of the total monomer derived units in one embodiment, and 85 to 99.5 wt % in another embodiment. The total multiolefin derived content in the copolymer is present in the range of mixture from 30 to 0.5 wt % in one embodiment, and from 15 to 0.5 wt % in another embodiment. In yet another embodiment, from 12 to 0.5 wt % of the polymer is multiolefin derived units. In yet another embodiment, from 8 to 0.5 wt % of the polymer is multiolefin derived units. Herein for the purpose of this invention, multiolefin refers to any monomer having two or more double bonds. In a preferred embodiment, the multiolefin is any monomer comprising two conjugated double bonds and may be an aliphatic or aromatic monomer.

The $C_4$ to $C_7$ isoolefin may be selected from compounds such as isobutylene, isobutene, 2-methyl-1-butene, 3-methyl-1-butene, 2-methyl-2-butene, 1-butene, 2-butene, methyl vinyl ether, indene, vinyltrimethylsilane, hexene, and 4-methyl-1-pentene. The multiolefin is a $C_4$ to $C_{14}$ multiolefin such as isoprene, butadiene, 2,3-dimethyl-1,3-butadiene, myrcene, 6,6-dimethyl-fulvene, hexadiene, cyclopentadiene, alkylstyrene, and piperylene, and other monomers such as disclosed in U.S. Pat. No. 5,506,316.

When the isoolefin is isobutylene, the elastomers may be referred to as "an isobutylene based elastomer". One embodiment of the isobutylene based butyl rubber polymer useful in the invention is obtained by reacting 92 to 99.5 wt % of isobutylene with 0.5 to 8 wt % isoprene, or 95 to 99.5 wt % isobutylene with 0.5 wt % to 5.0 wt % isoprene in yet another embodiment.

The elastomer may also be a random copolymer comprising a $C_4$ to $C_7$ isoolefins derived units and alkylstyrene derived units, the copolymer containing at least 85%, more alternatively at least 86.5 wt % of the isoolefin units, about 5% to about 12 wt % alkylstyrene units, and about 1.1% to about 1.5 wt % of a halogen. In one embodiment, the polymer may be a random elastomeric copolymer of a $C_4$ to $C_7$ α-olefin and a methylstyrene containing at about 8% to about 12 wt % methylstyrene. The poly(isobutylene-co-p-methylstyrene) polymers are also referred to as IMSM polymers.

Other $C_4$ to $C_7$ isoolefin derived unit containing elastomers suitable for use in the present invention include terpolymers comprising the isoolefin and two multiolefins wherein the multiolefins have different backbone structures prior to polymerization. Such terpolymers include both block and random terpolymers of $C_4$ to $C_8$ isoolefin derived units, $C_4$ to $C_{14}$ multiolefin derived units, and alkylstyrene derived units. One such terpolymer may be formed form isobutylene, isoprene, and alkylstyrene, preferably methylstyrene, monomers. Another suitable terpolymer may be polymerized from isobutylene, cyclopentadiene, and alkylstyrene monomers. Such terpolymers are obtained under cationic polymerization conditions.

Thus, polymers useful herein can be described as copolymers of a $C_4$ isomonoolefin derived unit, such as an isobutylene derived unit, and at least one other polymerizable unit with non-limiting examples of isobutylene-based elastomers including poly(isobutylene), butyl rubber (isoprene-isobuty)ene rubber, "IIR"), branched ("star-branched") butyl rubber, star-branched polyisobutylene rubber, block terpolymers of isoprene-isobutylene-styrene, random copolymers of isobutylene and para-methylstyrene, and random terpolymers of isobutylene, isoprene, and para-methyl styrene.

Exemplary elastomers are characterized by a narrow molecular weight distribution (Mw/Mn) of less than 5, alternatively less than 2.5, an exemplary viscosity average molecular weight in the range of 200,000 up to 2,000,000 and an exemplary number average molecular weight in the range of 25,000 to 750,000 as determined by gel permeation chromatography.

Method of Preparing Halogenated Elastomers

The brominated elastomer used in the present invention may be prepared by conventional bromination process or via bromine regeneration as detailed below. All of the examples of the present invention, provided in Table 1 to Table 4 below, have the same base bromobutyl elastomer. For half of the examples, the elastomer was prepared via conventional bromination known in the art. For the other half of the examples, the elastomer was prepared via bromine regeneration known in the art. Generally, bromobutyl elastomers prepared via either conventional bromination or bromine regeneration have a halogenation step, a neutralization step, and a packaging step. During the final packaging step, the water-slurried elastomer is dewatered, and the extrusion is dried to form elastomer crumbs for baling and/or packaging.

Conventional Bromination Process

Preparing butyl elastomers via conventional bromination is well known in the art, and is described in detail in, for example, U.S. Pat. Nos. 2,356,128, 4,474,924, 4,068,051, 7,232,872, and 7,414,101. As disclosed in these references, the monomers and catalysts are dissolved in a hydrocarbon diluent in which the polymerization occurs. If the polymerization is a slurry polymerization, the diluent is selected such that the resulting polymer will precipitate out of the diluent upon formation. Slurry polymerization conventionally yields a slurry containing 10 to 70 wt % solids in the slurry. Following polymerization, for both solution polymerization (wherein the polymer remains dissolved in the solvent) and slurry polymerization, the polymer must be recovered from the solvent. This is typically done in a flash drum, followed by washing and drying of the polymer to yield a rubber crumb suitable for baling and packaging.

Halogenation of the dissolved monomer is carried out by adding bromine to a polymer cement solution. Halogenation of isobutylene copolymers is also described in U.S. Pat. No. 5,670,582. The halogen wt % in the formed elastomer is from 0.1 to 10 wt % based on the weight of the halogenated elastomer in one embodiment, and from 0.5 to 5 wt % in another embodiment. In yet another embodiment, the halogen wt % of the halogenated rubber is from 1.0 to 2.5 wt %.

After halogenation, the solution is subjected to a neutralization step wherein HBr is reacted with an aqueous caustic solution to yield a soluble salt in an aqueous phase. Following neutralization, some or all of the aqueous phase may be optionally removed prior to removal of the hydrocarbon solvent in which the halogenated elastomer is still dissolved. For such water removal, the temperature of the solution should not exceed 100° C. or the properties of the final halogenated polymer may be negatively affected. After the neutralization step, a free radical scavenger can be added to the bromobutyl elastomers according the present invention.

The isobutylene-based polymer is then finished by stripping the solvents from either the slurry or the solution and drying of the resulting solid polymer into a crumb form that may be baled or packaged. The drying is conventionally accomplished using continuous helical path extruders wherein, as the polymer passes through the extruders, the elastomer solids are masticated and the water is squeezed or evaporated out of the mixture by the helical blades of the extruder.

The processes detailed in U.S. Pat. Nos. 5,670,582, 2,356,128, 4,474,924, 4,068,051, 7,232,872, and 7,414,101 are incorporated herein by reference.

Bromine Regeneration Process

One method of preparing bromobutyl elastomers via bromine regeneration is described in detail in U.S. Pat. No. 5,670,582. The bromine regeneration process involves contacting under free radical conditions (a) a polymer derived from $C_4$-$C_7$ isomonoolefins, e.g. isobutylene, (b) a halogenating agent and (c) an oxidizing agent, and recovering the halogenated copolymer. The bromine utilization can be increased by carrying out the reaction in the presence of an oxidizing agent which is added to the reaction medium either at the onset of the halogenation reaction, or, more preferably, in a second stage after the polymer has been partially halogenated.

Halogenating agents which may be used as a source of halogen in bromine regeneration include molecular bromine ($Br_2$), bromine chloride, iodine bromide and mixtures thereof. Where the free radical halogenation is conducted with the oxidizing agent present at the onset of the halogenation reaction, hydrogen bromide may be used as the halogen source. The preferred halogen source is molecular bromine.

Since a considerable portion of the hydrogen halide, e.g., hydrogen bromide, generated in-situ as a halogenation process by-product is oxidized to regenerate useful halogen, smaller amounts of halogenating agent are initially required to achieve a given degree of polymer halogenation than would be the case where the reaction is conducted without the use of oxidizing agent. As a general rule, the amount of halogenating agent present in the reaction media may vary between about 0.1 to 25 php (parts by weight per 100 parts by weight polymer), more preferably from about 0.2 to 10 php and most preferably from about 0.2 to 6 php.

Oxidizing agents found suitable for bromine regeneration are water soluble materials which contain oxygen. Preferred agents are peroxides and peroxide forming substances as exemplified by the following substances: hydrogen peroxide, sodium chlorate, sodium bromate, sodium hypochlorite or bromite, oxygen, oxides of nitrogen, ozone, urea peroxidate, acids such as pertitanic, perzirconic, perchromic, permolybdic, pertungstic, perunanic, perboric, perphosphoric, peipyrophosphoric, persulfates, perchloric, perchlorate and periodic acids. Of the foregoing, hydrogen peroxide and hydrogen peroxide forming compounds, e.g., per-acids and sodium peroxide, have been found to be most suitable for carrying out the process.

The amount of oxidizing agent used depends on the amount and kind of halogenating agent used. Generally, from about 0.1 to about 3 mols of oxidizing agent per mole of halogenating agent may be used. The preferred amount of oxidizing agent present in the reaction mixture ranges from about 1 to 2 mols per mol of halogenating agent.

The oxidizing agent may be introduced into the reaction zone as a solution in any suitable diluent such as carbon tetrachloride, lower alcohol, ether or water. Alternatively, the oxidizing agent is introduced as an aqueous solution or water-in-oil emulsion. When introduced as an aqueous solution, the solution may contain about 10-85 wt % of the oxidizing agent; when introduced as an emulsion, the emulsion may contain about 1-50 wt % of the oxidizing agent.

The halogenation reaction is conducted by first dissolving the copolymer in a suitable organic solvent such as a $C_4$ to $C_{10}$ aliphatic, cycloaliphatic or aromatic liquid. Solvents include normal hexane, cyclohexane, normal pentane, normal heptane and benzene, as well as halogen-containing solvents such as chlorobenzene, carbon tetrachloride and chloroform. The polymer solution, which may contain from as little as 1 wt % polymer or as much as 40 wt % polymer, is introduced into a reaction zone that is provided with suitable means to permit intimate contact with the reactants. The temperature of the polymer solution is adjusted to that which is most convenient for carrying out the reaction in view of the various properties of the reactants and the volatility of the solvent.

Where the oxidizing agent is introduced into the reaction zone at the onset of the halogenation reaction, it may be added prior to, concurrently with or subsequent to the addition of the halogenating agent and chemical free radical initiator, where present. More preferably, however, the oxidizing agent is not added to the reaction mixture until after at least about 50 wt %, more preferably about 75 to 100 wt % of the halogenating agent has been consumed in the halogenation reaction. Halogen consumption is indicated, where molecular bromine is used as the halogenating agent, by a change in color of the reaction mixture from reddish brown to a light tan or amber color. Halogen consumption can also be calculated stoichiometrically as a function of reaction speed under reaction conditions.

After completion of the halogenation reaction, the polymer is recovered by conventional techniques, e.g., neutralization with dilute caustic, water washing and removal of solvent such as by steam stripping techniques or by precipitation using a lower alcohol such as isopropanol. The process detailed in U.S. Pat. No. 5,670,582 is incorporated herein by reference.

Finishing and Packaging Process

Prior to the packaging step, a free radical scavenger can be added to the bromobutyl elastomers according the present invention.

Finishing and packaging of elastomers is well known to those skilled in the art, and are described in detail in, for example, U.S. Pat. Nos. 8,524,859 and 7,858,735. The finishing process involves obtaining a slurry comprising an elastomer and water based on the weight of the slurry, passing the slurry through a first dewatering device comprising at least two dewatering extruders in parallel to produce a wet elastomer crumb, passing the wet elastomer crumb through a second dewatering device to produce a partially dried elastomer crumb, and passing the partially dried elastomer crumb through a drying device to produce a dried elastomer crumb. After the finishing process, the elastomer may be baled and packaged.

Free Radical Scavenger

The term "free radical scavenger(s)" as used herein refers to, but is not limited to, sterically hindered nitroxyl ethers and sterically hindered nitroxyl radicals. WO 2008/003605A1 discloses the process for preparing sterically hindered nitroxyl ether from sterically hindered nitroxyl radicals by reacting the nitroxyl radicals with an aldehyde and a hydroperoxide. These nitroxyl ether formation may be carried out from different starting nitroxyl radicals, which are subsequently further reacted to the desired compounds.

The sterically hindered nitroxyl ether, according to the present invention, has, but is not limited to, the structure represented by either the formula (I) or (II).

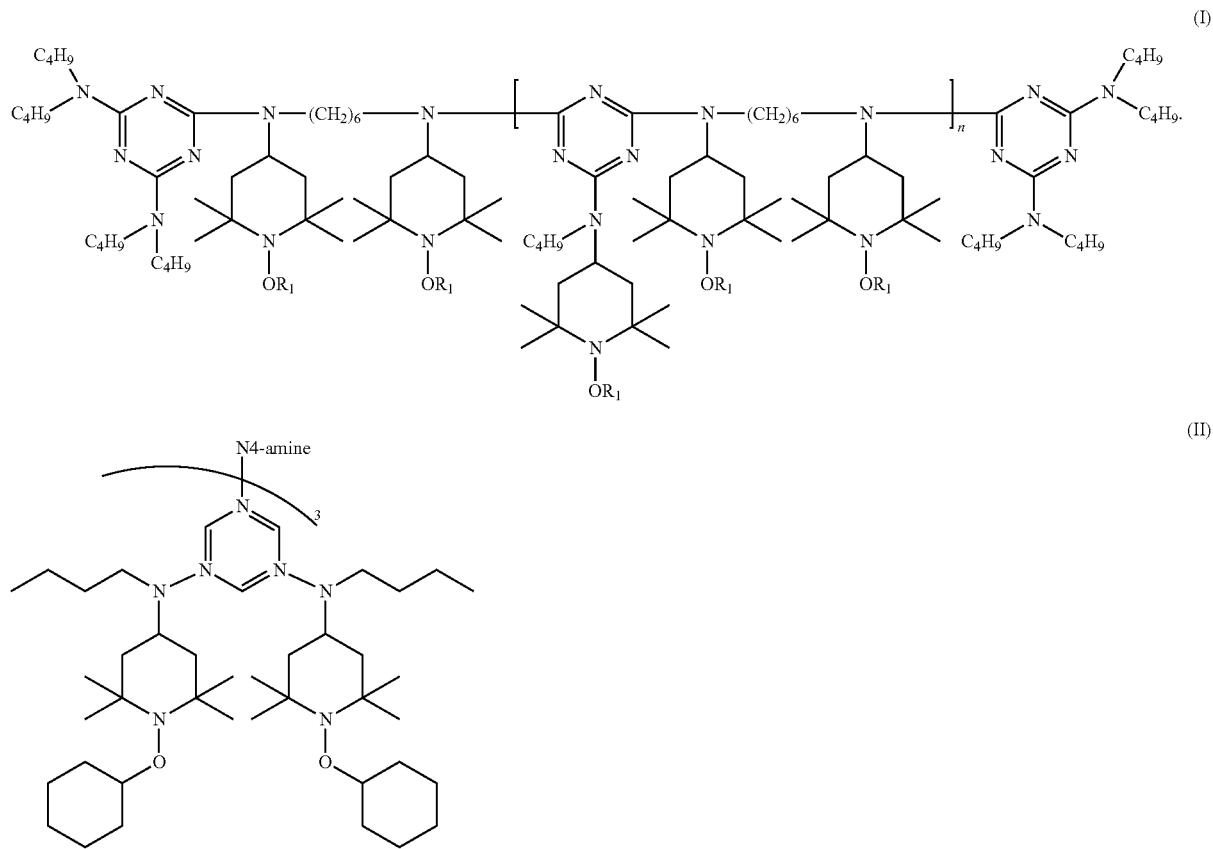

wherein N4-amine is

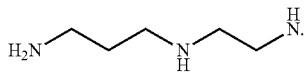

The sterically hindered nitroxyl radical has, but is not limited to, the structure represented by the formula (Ia).

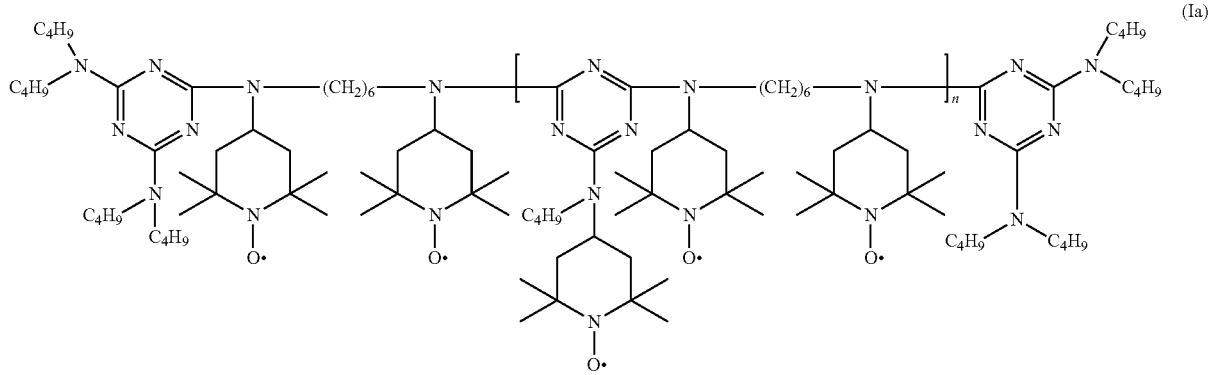

Commercially available examples of free radical scavengers that can be added during the preparation of bromobutyl elastomer in the present invention include, but are not limited to, TEMPO, Tinuvin™ NOR 371, and Tinuvin™ XT 200. TEMPO is a term generally used in the art to refer to 2,2,6,6-tetramethylpiperidin-1-yl)oxy. The sterically hindered nitroxyl radical tested in the invention is TEMPO. Tinuvin™ NOR 371 is a high molecular weight hindered amino ether (N—OR) hindered amine light stabilizer, commercially available from BASF as a plastic additive. The sterically hindered nitroxyl ether tested in the invention is Tinuvin™ NOR 371. It is expected that Tinuvin™ XT 200 will exhibit similar properties to that of Tinuvin™ NOR 371 as Tinuvin™ XT 200 is based on the NOR 371 class. Tinuvin™ XT 200 is a high performance light stabilizer based on high molecular weight hindered amine NOR light stabilizer, commercially available from BASF as a plastic additive. In embodiments, other free radical scavengers may be added to the bromobutyl-based elastomeric composition of the invention including, but not limited to, light stabilizers and UV-absobers.

The free radical scavenger can be added during the preparation of the brominated elastomer, such as after the neutralization step, after the preparation of the elastomer, such as prior to the packaging step, or both during and after the preparation of the brominated elastomer, as described herein.

The amount of free radical scavenger added to the brominated elastomer is at least about 0.05 wt % based on the total weight of the composition, at least 0.075 wt % of the total weight of the composition, at least 0.10 wt?.4) of the total weight of the composition, at least 0.125 wt % of the total weight of the composition, or at least 0.15 wt % of the total weight of the composition. The amount of free radical scavenger added to the composition is not more than 0.30 wt % of the composition, not more than 0.35 wt % of the composition, or not more than 0.40 wt % of the composition. A suitable weight range for the free radical scavenger is defined by any one of the above stated minimum amounts or any one of the above stated maximum amounts.

Specific Embodiments

The invention may also be understood with relation to the following specific embodiments.

Paragraph A: A bromobutyl elastomer composition, the composition comprising a brominated elastomer derived from a $C_4$ to $C_7$ isomonolefin and a free radical scavenger in the amount of at least about 0.05 wt % of the composition, wherein the Mooney viscosity of the composition does not increase by more than about 15% to about 40%, for up to about 15 days at 80 C.

Paragraph B: The composition of Paragraph A wherein the Mooney viscosity of the composition does not increase by more than about 10% to about 35%, for up to about 10 days at 80° C.

Paragraph C: The composition of Paragraph A or B wherein the composition comprises a free radical scavenger in the amount of at least 0.1 wt % of the composition, at least 0.125 wt % of the total weight of the composition, or at least 0.15 wt % of the total weight of the composition.

Paragraph D: The composition of Paragraph A and optionally Paragraph B and/or C, wherein the amount of free radical scavenger in the composition is not more than 0.30 wt % of the composition, not more than 0.35 wt % of the composition, or not more than 0.40 wt % of the composition.

Paragraph E: The composition of Paragraph A and optionally any one or any combination of Paragraphs B to D wherein the free radical scavenger is added during a conventional bromination process characterized by an absence of an oxidizing agent and a bromine regeneration process characterized by the inclusion of an oxidizing agent during bromination.

Paragraph F: The composition of Paragraph A and optionally any one or any combination of Paragraphs B to E wherein the free radical scavenger is preferably added during the conventional bromination process.

Paragraph G: The composition of Paragraph A and optionally any one or any combination of Paragraphs B to F wherein the free radical scavenger is selected from the group consisting of a sterically hindered nitroxyl ether, a nitroxyl radical, and both.

Paragraph H: The composition of Paragraph A and optionally any one or any combination of Paragraphs B to G wherein the free radical scavenger is preferably the sterically hindered nitroxyl radical.

Paragraph I: The composition of Paragraph A and optionally any one or any combination of Paragraphs B to H further comprising an antioxidant.

Paragraph J: An article made from the composition of Paragraph A and optionally any one or any combination of Paragraphs B to I.

Paragraph K: A method of stabilizing the Mooney viscosity of an elastomer, the method comprising obtaining a brominated elastomer derived from a $C_4$ to $C_7$ isomonolefin, adding to the brominated elastomer a free radical scavenger to the brominated elastomer to obtain a composition, the amount of scavenger being at least about 0.05 wt % of the composition, wherein the Mooney viscosity of the composition does not increase by more than about 40%, for up to about 15 days at 80 C.

Paragraph L: The method of Paragraph K wherein the Mooney viscosity of the composition does not increase by more than about 10% to about 35%, for up to about 10 days at 80° C.

Paragraph M: The method of Paragraph K or Paragraph L wherein the free radical scavenger is added to the composition in the amount of at least about 0.1 wt % of the composition to not more than 0.40 wt % of the composition or in the amount of at least 0.1 wt % of the composition to not more than 0.30 wt % of the composition.

Paragraph N: The method of Paragraph K and optionally any one of or any combination of Paragraphs L to M wherein the elastomer is brominated either in the presence or in the absence of an oxidizing agent and the free radical scavenger is added during the bromination.

Paragraph O: The method of Paragraph K and optionally any one or any combination of Paragraphs L to N wherein the free radical scavenger is added during a bromination process characterized by the absence of an oxidizing agent.

Paragraph P: The method of Paragraph K and optionally any one or any combination of Paragraphs L to O wherein the bromobutyl elastomer is prepared by a halogenation step, a neutralization step, a finishing step, and optionally a packaging step.

Paragraph Q: The method of Paragraph K and optionally any one or any combination of Paragraphs L to P wherein the free radical scavenger is added after the neutralization step, prior to the packaging step, and both after the neutralization step and prior to the packaging step.

Paragraph R: The method of Paragraph K and optionally any one or any combination of Paragraphs L to Q wherein the free radical scavenger is selected from the group consisting of a sterically hindered nitroxyl ether, a nitroxyl radical, or both.

Paragraph S: The method of Paragraph K and optionally any one or any combination of Paragraphs L to R wherein the free radical scavenger is preferably the sterically hindered nitroxyl radical.

Paragraph T: The method of Paragraph K and optionally any one or any combination of Paragraphs L to S further comprising adding an antioxidant.

Paragraph U: The composition of any one of Paragraphs A to I or the method of any one of Paragraphs J to T wherein the brominated elastomer is derived from isobutylene and isoprene and/or alkyl styrene.

EXAMPLES

Figure 2:
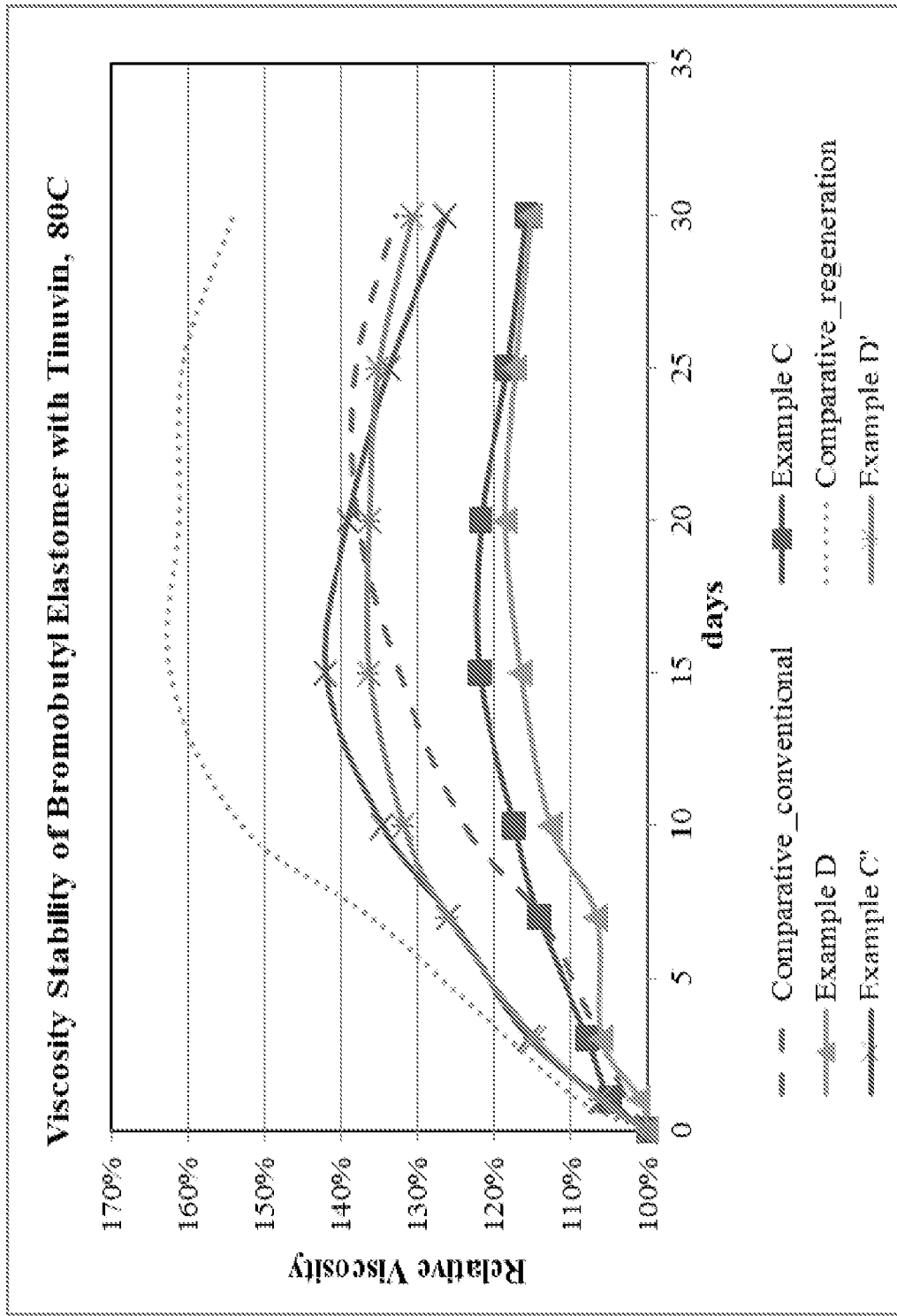
FIG. 2 depicts viscosity stability of bromobutyl elastomers having Tinuvin™ NOR 371.

The following procedure was specifically used in the preparation of the bromobutyl elastomer compositions within the scope of the present invention as set forth in the examples in Table 1 to Table 4 and shown in FIG. 1 and FIG. 2.

The bromobutyl elastomer was prepared via conventional bromination or bromine regeneration methods known in the art. The bromobutyl elastomer and the free radical scavenger were blended in a Brabender™ mixer at 80° C. for about 3 minutes. All of the bromobutyl elastomers used in the examples of the invention were pretreated with the antioxidant butylated hydroxytoluene (BHT). The present invention is not limited to bromobutyl elastomer compositions pretreated BHT with or without other antioxidants. It is also appreciated by the present invention that free radical scavengers can be added to bromobutyl elastomers that have not been pretreated with any antioxidants or stabilizers.

A control sample having no free radical scavenger was also mixed in the Brabender™ (labeled as Comparative in the Tables below). All Brabender™ mixed bromobutyl samples were aged in an air circulating oven at 80° C. for about 30 days. The samples aged at 80° C. for 5 days are expected to exhibit properties similar to bromobutyl elastomers in warehouse conditions for 1 year. The samples aged at 80° C. for 10 days are expected to exhibit properties similar to bromobutyl elastomers in warehouse conditions for 2 years. The samples aged at 80° C. for 15 days are expected to exhibit properties similar to bromobutyl elastomers in warehouse conditions for 3 years. The samples aged at 80° C. for 20 days are expected to exhibit properties similar to bromobutyl elastomers in warehouse conditions for 4 years. The samples aged at 80° C. for 25 days are expected to exhibit properties similar to bromobutyl elastomers in warehouse conditions for 5 years. The samples aged at 80° C. for 30 days are expected to exhibit properties similar to bromobutyl elastomers in warehouse conditions for 6 years.

Samples were taken in intervals of 0, 1, 3, 7, 10, 15, 20, 25, and 30 days at 80° C. and tested for Mooney viscosity in accordance with ASTM 1646. The change in Mooney viscosity was calculated to determine the effect of adding the free radical scavenger to the elastomer.

Example 1

Table 1, below, shows the Mooney viscosity of bromobutyl samples when TEMPO, in the amount of 0.05 wt % of the elastomer (Example A) and 0.1 wt % of the elastomer (Example B) was added during to a bromobutyl elastomer prepared via conventional bromination. Both Example A and Example B having TEMPO as a free radical scavenger show lower increases in Mooney compared to the control sample (Comparative) without TEMPO or any free radical scavenger. Example A having 50% of the amount of TEMPO as Example B shows higher increases in viscosity as compared to Example A for the duration of the aging period.

TABLE 1

| CONVENTIONAL BROMINATION | Comparative | Example A | Example B |
|---|---|---|---|
| TEMPO, wt % | 0 | 0.05 | 0.1 |
| Days Aged at 80° C. | Mooney Viscosity | Mooney Viscosity | Mooney Viscosity |
| 0 | 44.9 | 45.3 | 45.6 |
| 1 | 47.1 | 46.6 | 46.3 |
| 3 | 49.6 | 48.9 | 47.4 |

TABLE 1-continued

| | | | |
|---|---|---|---|
| 7 | 52.2 | 51 | 48.4 |
| 10 | 57.9 | 51.2 | 50.3 |
| 15 | 61.7 | 52.6 | 52.2 |
| 21 | 62.5 | 53.7 | 52.8 |
| 25 | 62.9 | 52.9 | 51.7 |

| Days Aged at 80° C. | Change in Mooney Viscosity | Change in Mooney Viscosity | Change in Mooney Viscosity |
|---|---|---|---|
| 0 | 0 | 0 | 0 |
| 1 | 2.2 | 1.3 | 0.7 |
| 3 | 4.7 | 3.6 | 1.8 |
| 7 | 7.3 | 5.7 | 2.8 |
| 10 | 13 | 5.9 | 4.7 |
| 15 | 16.8 | 7.3 | 6.6 |
| 21 | 17.6 | 8.4 | 7.2 |
| 25 | 18 | 7.6 | 6.1 |

Example 2

Table 2, below, shows the Mooney viscosity of bromobutyl samples when TEMPO, in the amount of 0.05 wt % of the elastomer (Example A') and 0.1 wt % of the elastomer (Example B') was added to a bromobutyl elastomer prepared via bromine regeneration. Both Example A' and Example B' with TEMPO as a free radical scavenger show lower increases in Mooney compared to the control sample (Comparative) without TEMPO or any free radical scavenger. Example A' having 50% of the amount of TEMPO as Example B' shows higher increases in viscosity as compared to Example A' for the duration of the aging period.

TABLE 2

| BROMINE REGENERATION | Comparative | Example A' | Example B' |
|---|---|---|---|
| TEMPO, wt % | 0 | 0.05 | 0.1 |

| Days Aged at 80° C. | Mooney Viscosity | Mooney Viscosity | Mooney Viscosity |
|---|---|---|---|
| 0 | 44.3 | 44.5 | 44.9 |
| 1 | 48.2 | 47.2 | 47.4 |
| 3 | 53.2 | 51.9 | 51.9 |
| 7 | 60.7 | 58.8 | 58.1 |
| 10 | 66.3 | 60.3 | 57.6 |
| 15 | 70.4 | 60.8 | 58.6 |
| 21 | 70.1 | 61.2 | 59.4 |
| 25 | 70.7 | 59.1 | 57.3 |

| Days Aged at 80° C. | Change in Mooney Viscosity | Change in Mooney Viscosity | Change in Mooney Viscosity |
|---|---|---|---|
| 0 | 0 | 0 | 0 |
| 1 | 3.9 | 2.7 | 2.5 |
| 3 | 8.9 | 7.4 | 7 |
| 7 | 16.4 | 14.3 | 13.2 |
| 10 | 22 | 15.8 | 12.7 |
| 15 | 26.1 | 16.3 | 13.7 |
| 21 | 25.8 | 16.7 | 14.5 |
| 25 | 18 | 7.6 | 6.1 |

The results from Table 1 and Table 2, above, indicate that TEMPO is a useful additive in improving the stability of Mooney growth of bromobutyl elastomers, prepared by either conventional bromination or bromine regeneration. Bromobutyl elastomers prepared via conventional bromination show lower increases in viscosity for the duration of the aging period, as seen in the Comparative example of Table 1 as compared to elastomers prepared via bromine regeneration, as seen in the Comparative example of Table 2. Accordingly, adding TEMPO to bromobutyl elastomers prepared via conventional bromination shows lower increases in viscosity for the duration of the aging period, as seen in Examples A and B of Table 1 as compared to elastomers prepared via bromine regeneration, as seen in Examples A' and B' of Table 2.

FIG. 1 graphically shows the increases in Mooney viscosity of bromobutyl samples having TEMPO, based on data from Table 1 and Table 2. The Comparative sample prepared via conventional bromination and the Comparative sample prepared via bromine regeneration show stable relative viscosity around Day 15. Examples A and B, elastomers prepared via conventional bromination, show stable relative viscosity around Day 15 and surprisingly decreasing relative viscosity around Day 20. Examples A' and B', elastomers prepared via bromine regeneration, show stable relative viscosity around Day 10 and surprisingly decreasing relative viscosity around Day 20. The increase in viscosity for Examples A and B is between about 10% to about 15% at Day 10 and about 15% at Day 15. The increase in viscosity for Examples A' and B' is between about 27% to about 35% at Day 10 and between about 30% to about 35% at Day 15.

Example 3

Table 3, below, shows the Mooney viscosity of bromobutyl samples when Tinuvin™ NOR 371, in the amount of 0.1 wt % of the elastomer (Example C) 0.2 wt % of the elastomer (Example D) was added to a bromobutyl elastomer prepared via conventional bromination. Both Example C and Example D with Tinuvin™ NOR 371 as a free radical scavenger show lower increases in Mooney compared to the control sample (Comparative) without Tinuvin™ NOR 371 or any free radical scavenger. Example C having 50% of the amount of TEMPO as Example D shows higher increases in viscosity as compared to Example D for the duration of the aging period.

TABLE 3

| CONVENTIONAL BROMINATION | Comparative | Example C | Example D |
|---|---|---|---|
| Tinuvin ™ NOR 371, wt % | | 0.1 | 0.2 |

| Days Aged at 80° C. | Mooney Viscosity | Mooney Viscosity | Mooney Viscosity |
|---|---|---|---|
| 0 | 44.6 | 44.1 | 44.6 |
| 1 | 45.9 | 46.3 | 45.1 |
| 3 | 47.4 | 47.6 | 47.3 |
| 7 | 50.9 | 50.4 | 47.6 |
| 10 | 55.3 | 51.8 | 50.3 |
| 15 | 59.1 | 53.8 | 52 |
| 20 | 61.5 | 53.7 | 52.9 |
| 25 | 61.6 | 52.2 | 52.3 |
| 30 | 59.3 | 51.1 | 51.4 |

| Days Aged at 80° C. | Change in Mooney Viscosity | Change in Mooney Viscosity | Change in Mooney Viscosity |
|---|---|---|---|
| 0 | 0 | 0 | 0 |
| 1 | 1.3 | 2.2 | 0.5 |
| 3 | 2.8 | 3.5 | 2.7 |
| 7 | 6.3 | 6.3 | 3 |
| 10 | 10.7 | 7.7 | 5.7 |
| 15 | 14.5 | 9.7 | 7.4 |
| 20 | 16.9 | 9.6 | 8.3 |

TABLE 3-continued

| | | | |
|---|---|---|---|
| 25 | 17 | 8.1 | 7.7 |
| 30 | 14.7 | 7 | 6.8 |

Example 4

Table 4, below, shows the Mooney viscosity of bromobutyl samples when Tinuvin™ NOR 371, in the amount of 0.1 wt % of the elastomer (Example C') 0.2 wt % of the elastomer (Example D') was added to a bromobutyl elastomer prepared via bromine regeneration. Both Example C' and Example D' with Tinuvin™ NOR 371 as a free radical scavenger show lower increases in Mooney compared to the control sample (Comparative) without Tinuvin™ NOR 371 or any free radical scavenger. Surprisingly, Example C' having 50% of the amount of TEMPO as Example D' shows lower increases in viscosity as compared to Example D' for Days 1, 7, 25, and 30 at 80° C.

TABLE 4

| BROMINE REGENERATION | Comparative | C' | D' |
|---|---|---|---|
| Tinuvin ™ NOR 371, wt % | 0 | 0.1 | 0.2 |
| Days Aged at 80° C. | Mooney Viscosity | Mooney Viscosity | Mooney Viscosity |
| 0 | 42.1 | 43.2 | 43.2 |
| 1 | 46 | 45.7 | 45.9 |
| 3 | 49.8 | 49.9 | 49.6 |
| 7 | 57.4 | 54.4 | 54.5 |
| 10 | 64.5 | 58.2 | 57 |
| 15 | 68.4 | 61.4 | 58.9 |
| 20 | 67.9 | 60.1 | 58.9 |
| 25 | 67.7 | 57.8 | 58.4 |
| 30 | 64.9 | 54.6 | 56.5 |
| Days Aged at 80° C. | Change in Mooney Viscosity | Change in Mooney Viscosity | Change in Mooney Viscosity |
| 0 | 0 | 0 | 0 |
| 1 | 3.9 | 2.5 | 2.7 |
| 3 | 7.7 | 6.7 | 6.4 |
| 7 | 15.3 | 11.2 | 11.3 |
| 10 | 22.4 | 15 | 13.8 |
| 15 | 26.3 | 18.2 | 15.7 |
| 20 | 25.8 | 16.9 | 15.7 |
| 25 | 25.6 | 14.6 | 15.2 |
| 30 | 22.8 | 11.4 | 13.3 |

The results from Table 3 and Table 4, above, indicate that Tinuvin™ NOR 371 is a useful additive in improving the stability of Mooney growth of bromobutyl elastomers, prepared by either conventional bromination or via bromine regeneration. Bromobutyl elastomers prepared via conventional bromination show lower increases in viscosity for the duration of the aging period, as seen in Examples C and D of Table 3 as compared to elastomers prepared via bromine regeneration, as seen in Examples C' and D' of Table 4. Adding lower amounts of Tinuvin™ NOR 371 to bromobutyl elastomers prepared by bromine regeneration show lower increases in viscosity for certain days of the aging period, but higher increases in viscosity for other days of the aging period. It is expected that Tinuvin™ XT 200 will exhibit similar properties to that of Tinuvin™ NOR 371 as Tinuvin™ XT 200 is based on NOR 371 class.

FIG. 2 graphically shows the increases in Mooney viscosity of bromobutyl samples having Tinuvin™ NOR 371, based on data from Table 3 and Table 4. The Comparative sample prepared via conventional bromination and the Comparative sample prepared via bromine regeneration show stable relative viscosity around Day 20 but surprisingly show decreasing relative viscosity around Day 25. Examples C and D, elastomers prepared via conventional bromination, show stable relative viscosity around Day 15. Example D', prepared via bromine regeneration, shows stable relative viscosity at around Day 15. Example C' does not show stable relative viscosity at any period during aging. The increase in viscosity for Example C and D is between about 12% to about 18% at Day 10 and between about 15% to about 22% at Day 15. The increase in viscosity for Example C' and D' is between about 32% to about 35% at Day 10 and between about 35% to about 42% at Day 15.

The results from Table 1 to Table 4, FIG. 1, and FIG. 2 indicate that bromobutyl elastomers having TEMPO exhibit greater stabilization of Mooney growth compared to elastomers having Tinuvin™ NOR 371. The results also indicate that Mooney growth is higher for bromobutyl elastomers prepared via bromine regeneration as compared to elastomers prepared via conventional bromination. The results also indicate that Mooney growth is generally lower for bromobutyl elastomers prepared with greater amounts of free radical scavengers.

Certain embodiments and features have been described using a set of numerical upper limits and a set of numerical lower limits. It should be appreciated that ranges from any lower limit to any upper limit are contemplated unless otherwise indicated. Certain lower limits, upper limits, and ranges appear in one or more claims below. All numerical values are "about" or "approximately" the indicated value, and take into account experimental error and variations that would be expected by a person having ordinary skill in the art.

To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

INDUSTRIAL APPLICABILITY

The inventive bromobutyl elastomer compositions can be used to make any number of articles. In one embodiment, the article is selected from tire curing bladders, tire innerliners, tire innertubes, and air sleeves. In another embodiment, the article is a hose or a hose component in multilayer hoses, such as those that contain polyamide as one of the component layers. Other useful goods that can be made using compositions of the invention include air spring bladders, seals, molded goods, cable housing, and other articles disclosed in THE VANDERBILT RUBBER HANDBOOK, p 637-772 (Ohm, ed., R.T. Vanderbilt Company, Inc. 1990).

All priority documents, patents, publications, and patent applications, test procedures (such as ASTM methods), and other documents cited herein are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated.

What is claimed is:

1. A brominated elastomer composition, the composition consisting essentially of a brominated isobutylene based elastomer, a free radical scavenger in the amount of 0.05 wt % to 0.3 wt % of the composition, and optional antioxidants, wherein the Mooney viscosity of the composition does not increase by more than about 15% to about 40%, for up to about 15 days at 80° C., wherein the free radical scavenger is sterically hindered nitroxyl ether.

2. The composition of claim 1, wherein the Mooney viscosity of the composition does not increase by more than about 10% to about 35%, for up to about 10 days at 80° C.

3. An article made from the composition of claim 1.

4. The composition of claim 1 further comprising an antioxidant.

* * * * *